United States Patent

Tomczyk

[19]

[11] Patent Number: 5,947,156
[45] Date of Patent: Sep. 7, 1999

[54] HOLDING TANK HAVING WASTE EVACUATION DEVICE

[76] Inventor: Frederick A. Tomczyk, 3889 Christopher, Brighton, Mich. 48116

[21] Appl. No.: 08/815,424

[22] Filed: Mar. 11, 1997

[51] Int. Cl.$^6$ .................................................. F16K 27/12
[52] U.S. Cl. ...................... 137/899; 137/355.16; 137/899
[58] Field of Search ............................... 137/355.16, 899, 137/615

[56] References Cited

U.S. PATENT DOCUMENTS

| | | | |
|---|---|---|---|
| 2,915,081 | 12/1959 | Warren | 137/899 |
| 3,496,959 | 2/1970 | Wolfe et al. | 137/899 |
| 3,811,462 | 5/1974 | Feliz | 137/344 |
| 4,133,347 | 1/1979 | Mercer | 137/344 |
| 4,223,702 | 9/1980 | Cook | 137/355.16 |
| 4,550,453 | 11/1985 | Norman . | |
| 4,554,949 | 11/1985 | Sell | 137/899 |
| 4,650,224 | 3/1987 | Smith | 137/899 |
| 4,776,631 | 10/1988 | Sargent et al. | 141/95 |
| 4,779,650 | 10/1988 | Sargent et al. | 137/899 |
| 4,796,926 | 1/1989 | Rapsilver | 141/392 |
| 4,811,753 | 3/1989 | Bethune | 137/899 |
| 4,844,121 | 7/1989 | Duke . | |
| 4,854,349 | 8/1989 | Foreman | 137/899 |
| 4,875,504 | 10/1989 | Nicholson | 137/899 |
| 4,892,349 | 1/1990 | Sargent . | |
| 4,974,899 | 12/1990 | Sargent . | |
| 5,023,959 | 6/1991 | Mercer | 137/355.16 |
| 5,031,249 | 7/1991 | Sargent | 4/431 |
| 5,056,166 | 10/1991 | Sargent et al. | 4/321 |
| 5,247,974 | 9/1993 | Sargent et al. . | |
| 5,257,653 | 11/1993 | Nimberger . | |
| 5,323,813 | 6/1994 | Barrett | 137/899 |
| 5,445,190 | 8/1995 | Gunder . | |

*Primary Examiner*—A. Michael Chambers
*Attorney, Agent, or Firm*—Bliss McGlynn, P.C.

[57] ABSTRACT

A waste evacuation device mountable to a holding tank located below the ground and having at least one inlet. The waste evacuation device includes a base disposed above the ground and accommodating the inlet to the holding tank. The device further includes a telescoping arm having first and second ends and a flexible coupling mounted to the base and providing fluid communication between the telescoping arm and the inlet to the holding tank. The telescoping arm is mounted to the flexible coupling at its first end and is extendible in a telescoping fashion from the flexible coupling and includes a connector located at the second end for providing selective fluid communication with a source of waste. The flexible coupling is pivotable about a first axis and rotatable about a second axis to provide relative adjustability for the telescoping arm such that the connector may be positioned to be selectively connected with a source of waste.

16 Claims, 4 Drawing Sheets

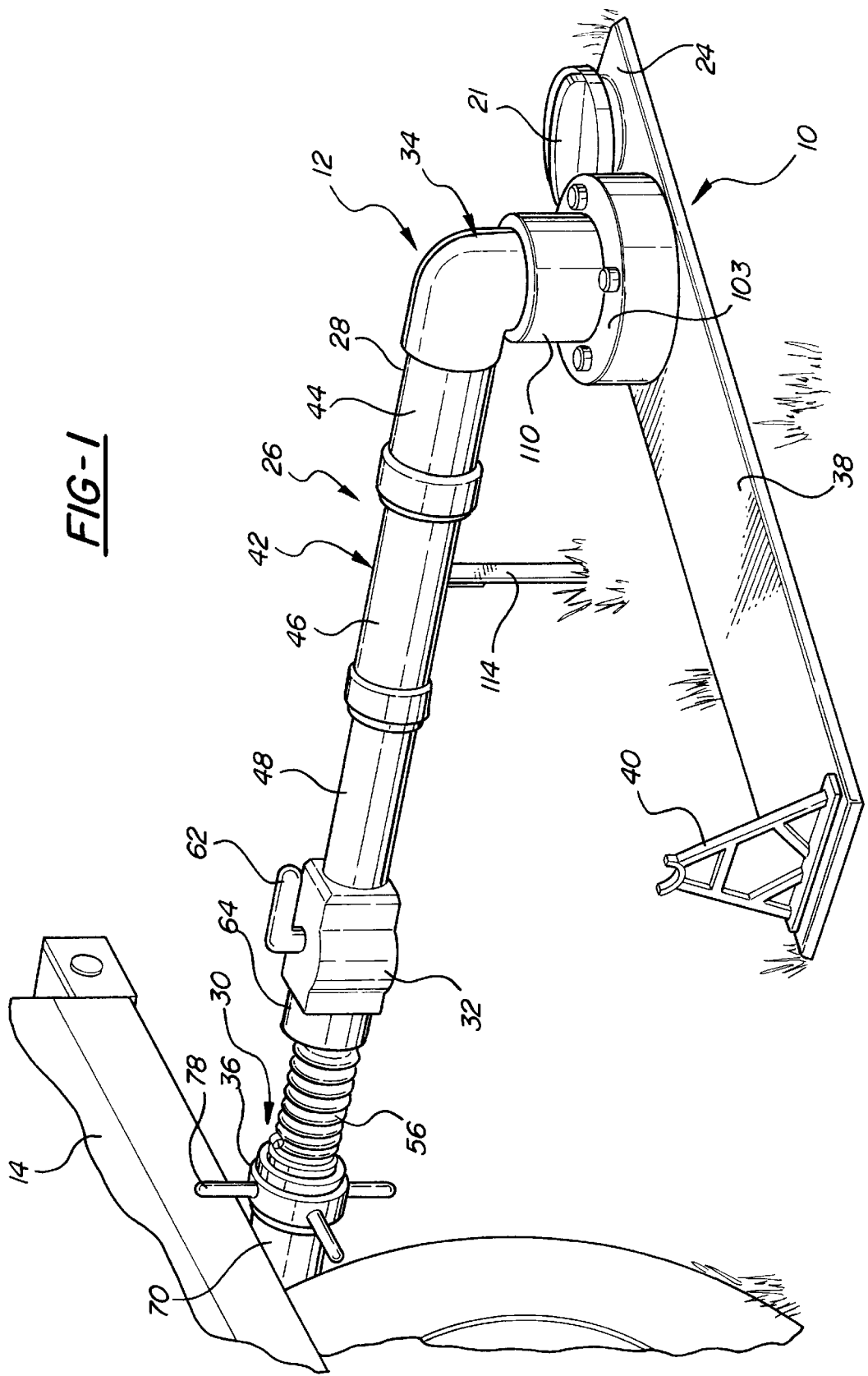

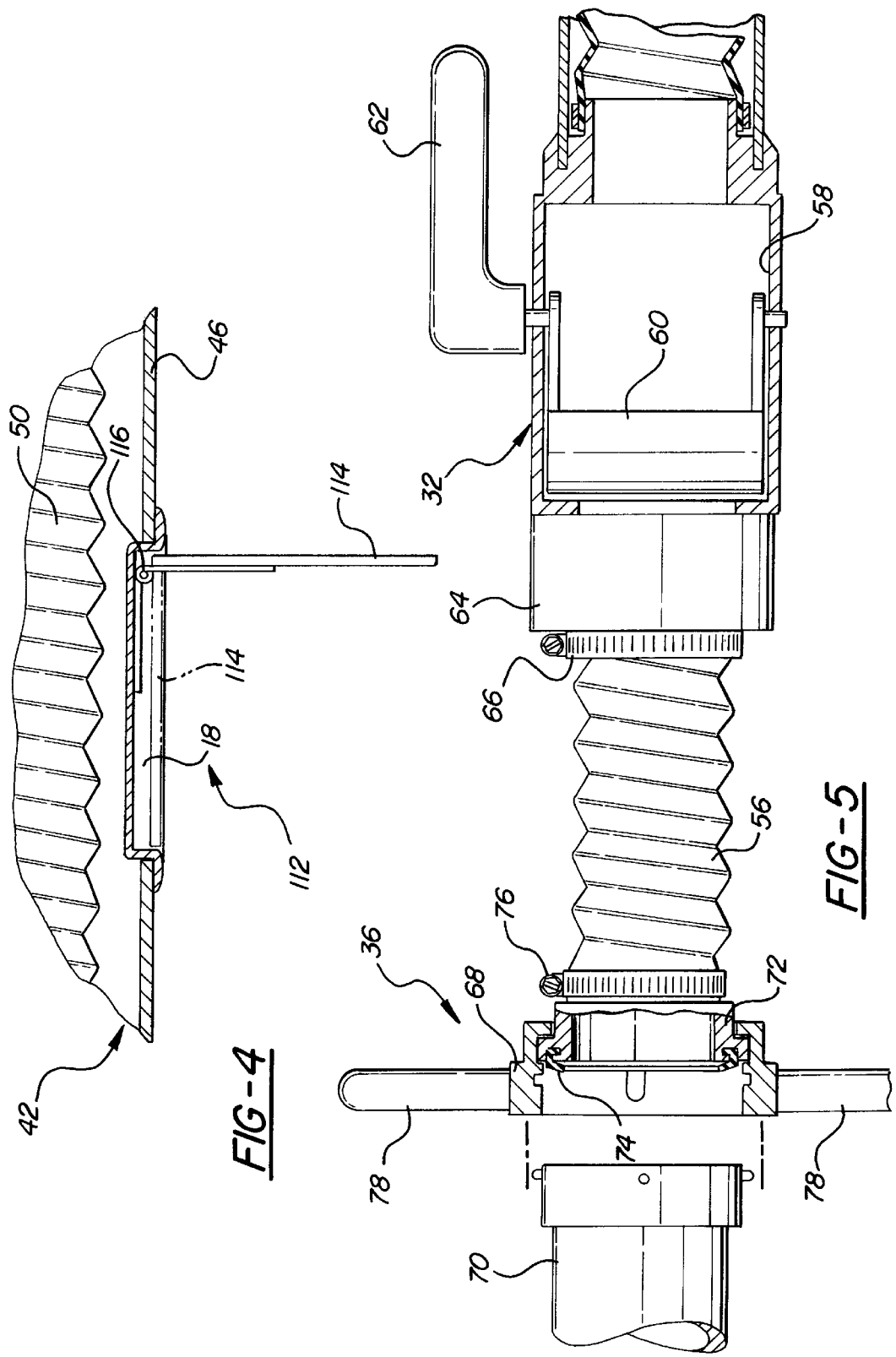

HOLDING TANK HAVING WASTE EVACUATION DEVICE

BACKGROUND OF THE INVENTION

1. Field of the Invention

The present invention relates generally to a holding tank having a waste evacuation device and, more specifically, to a holding tank having a waste evacuation device which is particularly adapted for use at campgrounds and the like for receiving and holding waste originating from recreational vehicles and the like.

2. Description of the Related Art

The present invention is particularly adapted for servicing recreational vehicles (RVs) such as motor homes and travel trailers by providing a means for receiving and holding the waste which may be generated by such RVs. For convention purposes, those who own or operate Recreational Vehicles will be referred to herein as RVers. Additionally, the present invention is particularly adopted for use at campgrounds and the like where many RVers enjoy access to rural settings while maintaining most, if not all, of the comforts of home. Today, many RVs are entirely self-contained which means they have not only their own living accommodations, but all related conveniences as well. One of the conveniences is a complete self-contained water use system including sanitary fixtures such as sinks, showers, baths, toilets and the like. Fresh water for the system is contained in one or more fresh water tanks while waste liquid is stored in one or more holding tanks. Typically, there are separate waste holding tanks for what is commonly respectively referred to as "gray water" and "black water". Gray water is waste water from sinks and showers whereas black water is waste from toilets.

Waste water tanks are typically mounted to the exterior of the RV body, usually being suspended from the chassis below the body floor. The waste tanks have inlets which are in communication with outlets of the respective sanitary fixtures which they serve. Each waste tank has an outlet controlled by a gate valve. Currently, RVers use an evacuation hose that is stored either in the bumper or in an external storage compartment. The hose has a standard fitting on one end that allows the hose to be affixed to the RV. Holding tank evacuation takes place when valves on the RV are opened and the effluent from the black water and gray water tanks passes through the hose into a dump port at an evacuation site. Optional devices can be purchased to mount to the port end of the hose to hold the hose in place in the dump port. In addition, devices can be purchased to support the hose from the vehicle to the pump port in order to supply a continuous downward slope, improving the evacuation process.

Unfortunately, there are numerous problems with such evacuation hoses of the related art. For example, leaks in the hose can often occur due to the abrasion of being dragged on the ground and stored in bumpers. Such leaks leave waste and holding tank chemicals on the ground around the RV and the dump port as well as on the RVer's hands during the evacuation process.

In addition, and because the hose is flexible, handling it is at best messy, and complete evacuation is a chore. In fact, unless additional hardware is purchased to connect the hose to the RV, hold the hose in place in the dump port during evacuation, and add a hose support device to facilitate continuous, smooth, "downhill" outflow, the operator of the evacuation hose can have a very unpleasant experience. More specifically, without a connector, the holding tanks cannot be evacuated properly. Without hardware to hold the hose in place during evacuation, the sudden rush of effluent when the valves are opened can cause the delivery end of the hose to spring free from the dump port causing unsanitary and unsafe messes around the site. Further and without a hose support device, during evacuation, waste will settle in the lowest portion of the hose thereby requiring the RVer to "play" the hose in order to get the waste out and into the dump port.

The time required to evacuate these tanks is also an issue. Due to the necessary involvement of the RVer in the operation in such waste evacuation devices as described above, the experienced RVer may spend ten or more minutes at this chore while less experienced RVers are typically involved in a much longer process.

In addition, the evacuation devices presently employed in the related art result in relatively large potential for unsanitary dump sites left by the RVers. Thus, as a result of "spills," the campgrounds need to "police the sites." At best, if this is done properly, it is a costly and messy activity for the campground. At worst, the site is not policed and the next RVer is left with the situation described above. Further, for the RVer, there is the ongoing cost of replacement hoses as well as the additional cost of various attachment hardware described above.

Alternatively, the evacuation hose may be permanently mounted or otherwise "hooked up" to the vehicles evacuation port. This device may include a telescoping plastic housing which supports a flexible hose which may be extended from the vehicle to the dump port. A valve at the dump port end of the unit significantly reduces the messiness of evacuation while the self-contained hose ends the RVers contact with this item. A representative example of a drain assembly for recreational vehicles in the related art is disclosed by U.S. Pat. No. 4,779,650 issued on Oct. 25, 1988 to Sargent, et al.

As with the other evacuation devices of the related art, there are several problems which limit the success of this product. For example, and because of its mounting location below the RV or in a basement compartment, the size of the unit is restricted. The size restrictions limit the useful length of the product during evacuation to approximately 7 feet. Where greater length is required, an adapter that allows a standard sewer hose to be attached is available. However, this attachment introduces all of the problems of the related devices addressed above.

In addition, the dump port end of the permanently attached evacuation device is typically a fixed plastic shape that does not conform to all dump ports. An RVer thus may find himself at a facility that will not accept the unit unless a sewer hose is attached. There is also the cost and sometime significant problems in retrofitting the RV with this permanent device.

Another alternative technology currently in use is the "honeywagon." Honeywagons are vehicles with pump out capabilities and are typically owned by the campground. These vehicles are brought to individual sites, an evacuation hose is hooked up to the RVer's coach and the contents of the holding tanks are drawn into a large container on the back of the vehicle. Once again, however, there are problems with this approach. For example, the RVer is forced to empty his/her tanks when the wagon is available or scheduled, not when it is convenient for the RVer. In addition, the wagon must be operated by campground personnel. Thus, there is a cost incurred whether or not the unit is being used.

Accordingly, there is a need in the art for a holding tank having a waste evacuation device which are located at the campgrounds and the like and which are specifically adapted to receive and hold waste originating with the recreational vehicles. More specifically, there is a need in the art for a holding tank having a waste evacuation device which is cost-effective and which is adapted to service multiple RVs and the like and which relieves the RVer of the chores associated with vehicle mounted drain assemblies and overcomes the problems associated with these devices.

SUMMARY OF THE INVENTION

The present invention overcomes the problems in the related art in a holding tank assembly and waste evacuation device which is adapted to receive and hold waste originating from a source such as a recreational vehicle. The holding tank includes a reservoir having at least one inlet for receiving and holding waste originating from the source, typically a recreational vehicle. A telescoping arm having first and second ends and a valve disposed therebetween provides fluid communication between the source and the reservoir. A flexible coupling is mounted to the reservoir and provides fluid communication between the telescoping arm and the inlet to the reservoir.

The telescoping arm is mounted to the flexible coupling at its first end and is extendable in telescoping fashion from the flexible coupling. Furthermore, the telescoping arm includes a connector located at its second end for providing removable fluid communication with the source of waste, for example the outlet for the gray water or black water holding tanks of a recreational vehicle. The flexible coupling is pivotable about a first axis and rotatable about a second axis to provide relative adjustability of the telescoping arm such that the connector may be positioned to be removably connected to the source of the waste.

One advantage of the present invention is that a holding tank is provided having a waste evacuation device which is adapted to service multiple sources of waste such as recreational vehicles. Another advantage of the present invention is that it provides for a telescoping arm which is operatively connected to a flexible coupling which is pivotable about a first axis and rotatable about a second axis which provides relative adjustability for the telescoping arm such that the assembly is generally adapted to service many different types of recreational vehicles and the like. Another advantage of the present invention is that it obviates the need for the recreational vehicle to carry complicated drainage assemblies for its gray and black water tanks. Still another advantage of the present invention is that it is not subject to the size limitations which are typically associated with RV mounted drainage assemblies. Still another advantage of the present invention is that it is cost-effective, efficient and reduces the likelihood of waste spills, any associated clean up and reduces the need for policing activity at the campgrounds and the like.

Other features and advantages of the present invention will be readily appreciated as the same becomes better understood after reading the subsequent description when considered in connection with the accompanying drawings.

BRIEF DESCRIPTION OF THE DRAWINGS

FIG. 1 is a perspective view of the waste evacuation device of the present invention shown in its operative mode;

FIG. 4 is a partial cross-sectional side view of the center support of the present invention;

FIG. 5 is a partial cross-sectional side view of the valve, flexible portion and connector of the present invention;

DESCRIPTION OF THE PREFERRED EMBODIMENT(S)

Referring now to the figures, where like numbers are used to designate like structure throughout, a holding tank assembly having a waste evacuation device generally indicated at 12 is shown at 10 in the figures. The assembly 10 is adapted to receive and hold waste originating from a source, such as a recreational vehicle (RV) which is generally indicated at 14 in FIG. 1. However, it will be appreciated that the source of waste forms no part of the present invention and may include a number of types of vehicles, whether recreational or otherwise, as well as any other device, entity or thing which may produce waste and for which the waste evacuation device 12 of the present invention may be employed to receive and hold such waste. Further, the present invention is particularly adapted for use at campgrounds and the like which service such recreational vehicles. Again however, it will be appreciated that the assembly 10 is in no way limited by the location of its use.

Figures 2, 3:
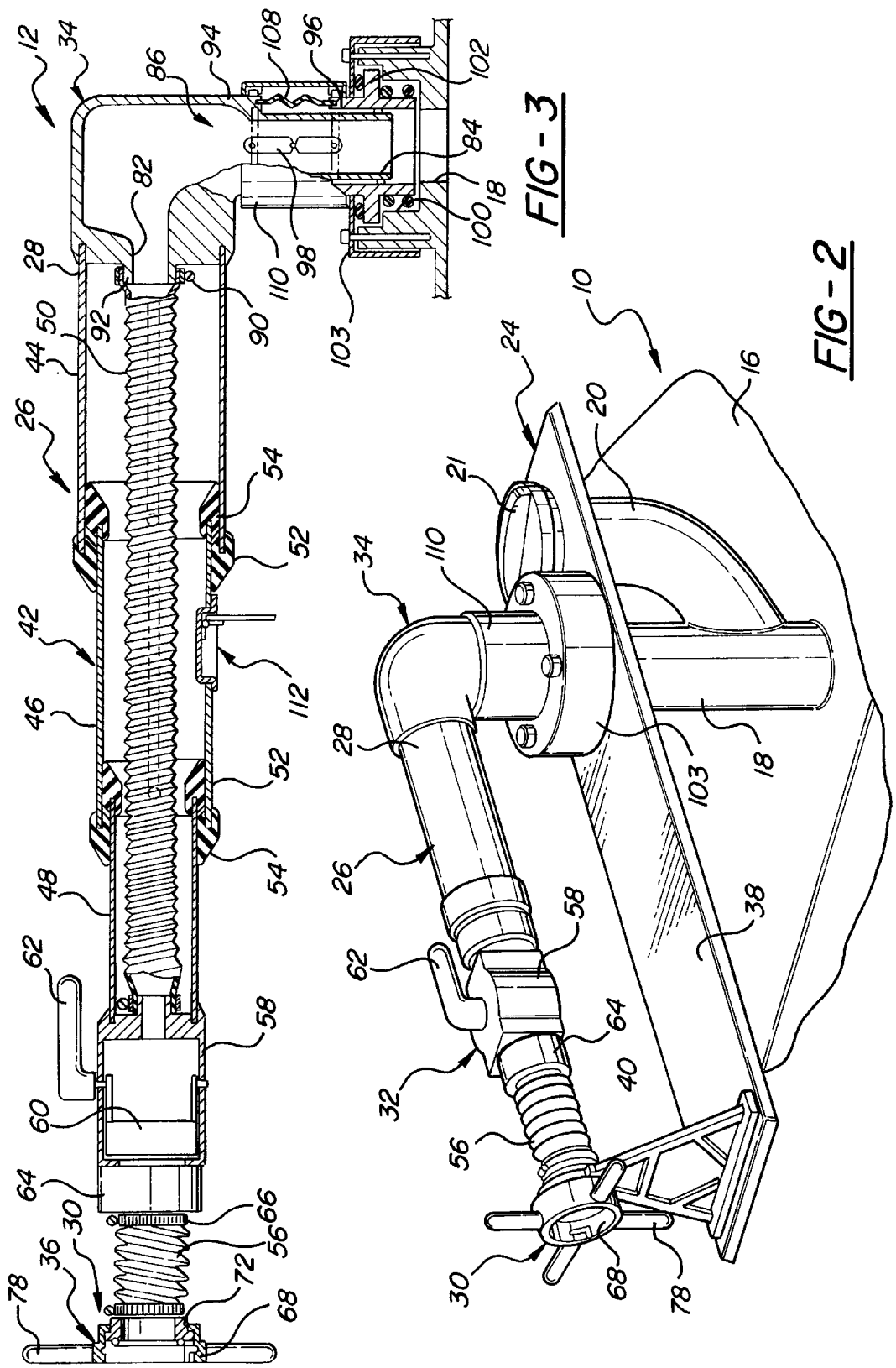
FIG. 2 is a perspective view of the waste evacuation device of the present invention shown in its stored position.
FIG. 3 is a cross-sectional side view of the present invention.

As best shown in FIG. 2, the assembly 10 includes a holding tank or reservoir 16 which is typically located below the ground. The reservoir 16 may be a self-contained unit or it may form a part of a larger sewer system which services the campground. In one preferred use, the waste evacuation device 12 of the present invention may be employed at all or some of the campsites which service RVs and the like at such campgrounds. Alternatively, the present invention may be employed at one or more centralized dump sites at the campground.

The reservoir 16 includes at least one inlet 18, 20. In one preferred embodiment, the reservoir 16 will include two inlets 18, 20 which may be formed by a Y-joint 22. The Y-joint may be made of any suitable material but in the preferred embodiment is a polyvinylchloride Y-joint pipe having two inlets 18, 20 which feed the reservoir 16. One of the inlets 18 accommodates the waste evacuation device 12 as will be described in greater detail below. The other inlet 20 is adapted to accommodate RVs and the like having vehicle mounted waste drainage assemblies of the type described in the related art. Further, the second inlet 20 may also be employed to pump out the reservoir 16. The second inlet 20 may include a removable cap 21.

The waste evacuation device 12 of the present invention includes a base, generally indicated at 24, which is disposed above ground and which accommodates the inlets 18, 20 to the reservoir. The waste evacuation device 12 of the present invention is mountable to the holding tank or reservoir 16 and includes a telescoping arm, generally indicated at 26, having first and second ends, generally indicated at 28 and 30, respectively. A valve, generally indicated at 32 is disposed between the first and second ends 28, 30 of the telescoping arm 26 for providing fluid communication between the source and the reservoir 16. The valve 32 is operable to control the flow of the waste through the telescoping arm as will be described in greater detail below.

The waste evacuation device 12 further includes a flexible coupling, generally indicated at 34 which is mounted to the base 24 and provides fluid communication between the telescoping arm 26 and the inlet 18 to the reservoir 16. The telescoping arm 26 is mounted to the flexible coupling 34 at its first end 28 and is extendable in telescoping fashion from the flexible coupling 34. A connector, generally indicated at 36, is located at its second end 30 for providing selective fluid communication with a source of waste. The base 24 includes a cover 38 having a cradle 40. When the telescoping arm 26 is in its retracted position, it may be supported by the cradle 40. Further, the cradle 40 may include a pay-per-use locking device (not shown) through which the campground may generate revenues for using the waste evacuation device 12 of the present invention.

Referring now to FIGS. 1 through 3, the telescoping arm 26 includes a tubular telescoping housing, generally indicated at 42. The housing 42 includes two or three distinct sections of descending diameter 44, 46, 48, respectively. The housing 42 may be made of a hard, durable plastic material, polyvinylchloride, or any other suitable structural material. A flexible, compressible tube or hose 50 is supported in the telescoping housing 44, 46 and 48. The first and last sections 44 and 48, respectively, of the housing 42 includes stop portions 52 which interact with stop portions 54 located at both ends of the middle section 46 as shown in FIG. 3. The housing 42 and tube 50 are attached at one end 28 to the flexible coupling 34 as will be described in greater detail below.

At the other end 30 of the telescoping arm 26 there is a flexible portion 56 extending between the connector 36 and the valve 32. The flexible portion 56 further facilitates a smooth coupling between the waste evacuation device 12 and the recreational vehicle because it may be manipulated in multiple directions to position the connector 36 to accommodate the RV waste outlet as will be described in greater detail below.

Figure 6:
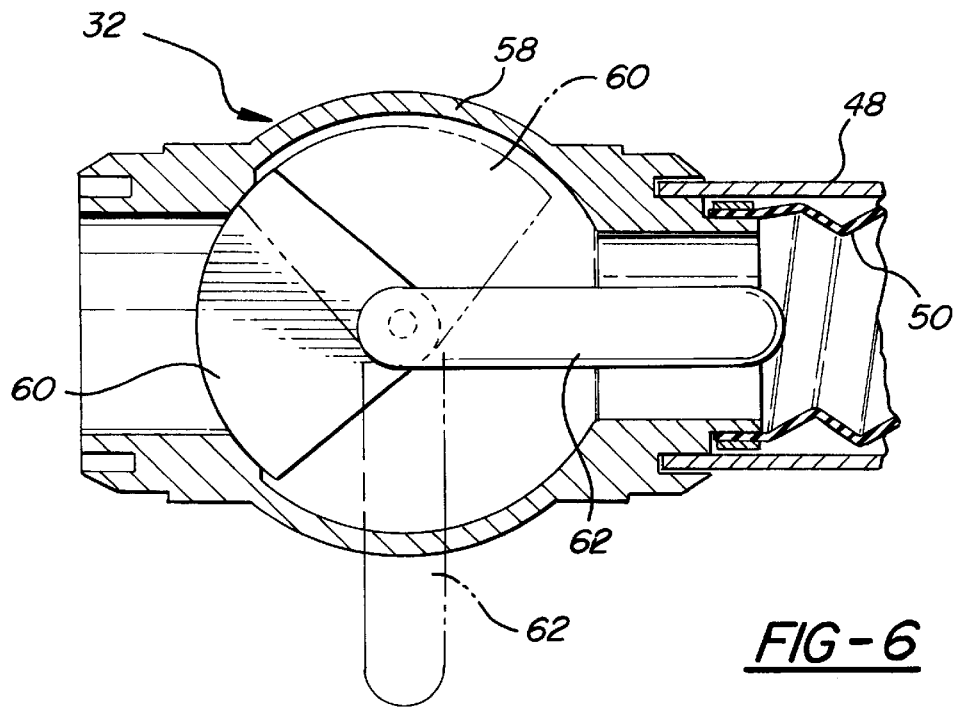
FIG. 6 is a cross-sectional top view of the valve of the present invention.

As best shown in FIGS. 5 and 6, the valve 32 includes a valve body 58 and a valve member 60 which may be manually actuated through lever 62 between its closed position, shown in solid lines, and its open position shown in dotted lines in FIG. 6. Alternatively, the valve 32 may be electromechanically actuated. A breakaway coupling 64 interconnects the flexible portion 56 and the valve body 58 via a hose clamp 66. The breakaway coupling 64 is adapted to fail and interrupt fluid communication between the source of waste (e.g. an RV) and the waste evacuation device 12. This may occur, for example, where someone inadvertently tries to drive the RV while it is coupled to the waste evacuation device 12 of the present invention. The breakaway coupling 64 is designed to fail before any other element of the waste evacuation device, thereby protecting the device and limiting the damage which may occur as a result of such an accident.

Referring now to FIG. 5, the connector 36 includes an outer locking collar 68 which is received on the waste outlet 70 of the RV and an inner collar 72 which is fixed relative to the locking collar 68. The locking collar 68 rotates relative to the inner collar 72 to secure the waste evacuation device 12 to the RV 14. Large finger tabs 78 extend radially outward from the outer collar 68 to facilitate this connection. A gasket or the like 74 is employed to seal the connection between the connector 36 and the outlet 70 of the RV. A hose clamp 76 may be employed to provide clamping pressure between the flexible portion 56 and an annular lip on the fixed inner collar 72.

The flexible coupling 34 is pivotable about a first axis and rotatable about a second axis to provide relative adjustability for the telescoping arm 26 such that the connector 36 may be positioned to be selectively connected to a source of waste. More specifically, the flexible coupling 34 is pivotable about a horizontal axis and rotatable 360° about a vertical axis to provide this relative adjustability. To this end and referring to FIGS. 3 and 7, the flexible coupling 34 includes a body 80 having an inlet port 82 in fluid communication with the tube 50 of the telescoping arm 26, a dump port 84 in fluid communication with the reservoir 16 and a central passage, generally indicated at 86, extending therebetween. The central passage 86 is rotatable about a horizontal axis as will be described in greater detail below.

The body 80 includes an annular slot 88 which receives the largest, first section 44 of the tubular housing 42. The tube 50 is sealingly connected to the inlet port 82 via a hose clamp 90 which applies clamping pressure between the tube 50 and an annular lip 92 best shown at FIG. 3.

The body 80 further includes an upper portion 94 and a lower portion 96 with a hinge, generally indicated at 98, pivotable about a horizontal axis and operatively interconnecting the upper and lower portions 94 and 96, respectively, to provide pivotal movement of the body 80 of the flexible coupling 34 about a horizontal axis.

Figure 7:
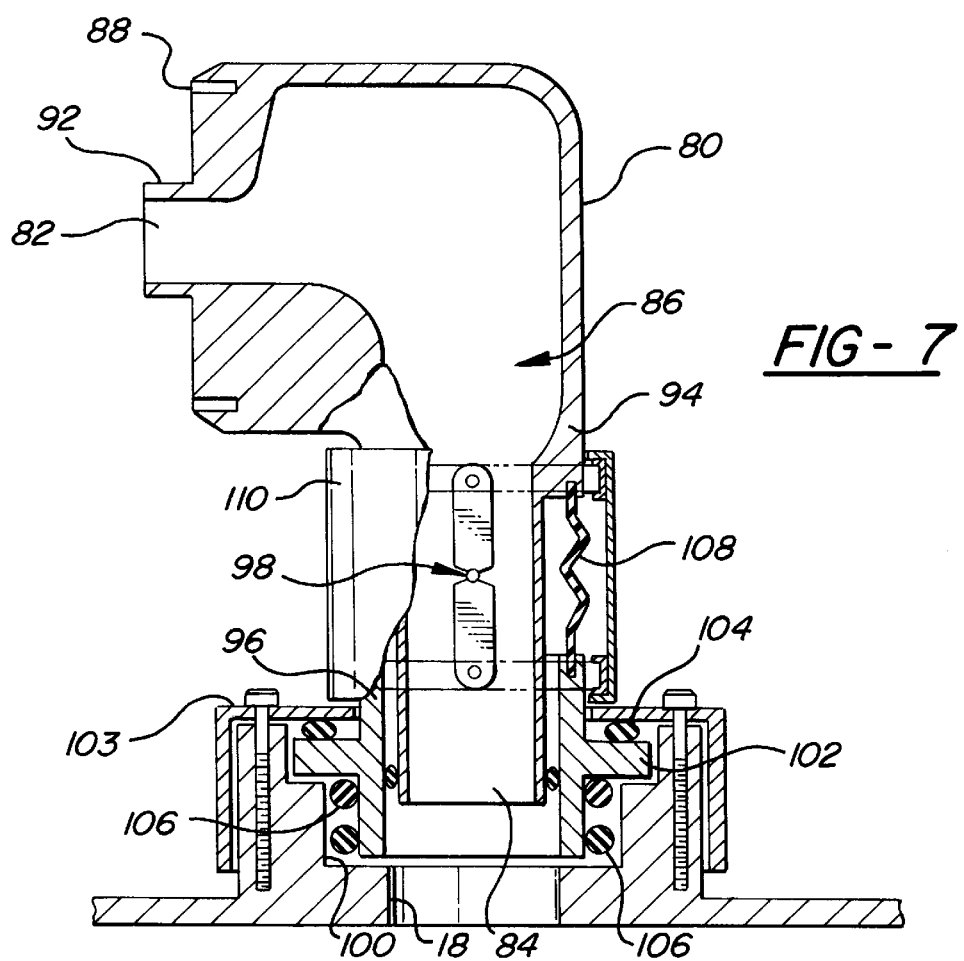
FIG. 7 is a cross-sectional side view of the flexible coupling of the present invention.

The inlet 18 defines a stepped bore 100. The lower portion 96 is rotatably received within the stepped bore 100 of the inlet 18 to the reservoir 16. The lower portion 96 includes an annular flange 102. A gasket 104 is sealingly disposed between the annular flange 102 and an annular cap 103. Additionally, the flexible coupling 34 includes at least one bearing 106 disposed between the lower portion 96 and the stepped bore 100 of the inlet 18 for providing smooth, rotatable movement of the flexible coupling 34 360° about a vertical axis. A flexible sleeve 108 extends between the upper and lower portions 94, 96 and protects the pivot hinge 98 from contamination by effluent. An annular collar 110 encloses the pivot hinge 98 and sleeve 108 between the upper and lower portions 94, 96 as shown in FIG. 7. The annular collar 110 protects the working elements of the flexible coupling from the effects of weather, inadvertent impact or vandalism.

For extended length applications, a center support, generally indicated at 112 may be employed as shown in FIG. 4. The center support 112 includes a leg 114 hingedly mounted to the telescoping housing 42 via a spring-biased hinge 116 and adapted to support the telescoping arm 26 relative to the ground. When not in use, the leg 114 is stored in a recessed compartment 118 of the telescoping housing 42 as shown in phantom in FIG. 4.

OPERATION

In operation, the telescoping arm 26 is released from its cradle 40 on the base 24 and swung out in the direction of the RV 14 or the like which is parked adjacent the waste evacuation device 12 of the present invention. To this end, the body 80 of the flexible coupling 34 rotates about a vertical axis until it is positioned such that the telescoping arm 26 may be extended in the direction of the waste outlet 70 on the RV 14. More specifically, the housing 42 telescopes outwardly with the two or three sections 44, 46, 48 moving relative to one another as needed. At the same time, the compressible tube 50 is similarly extended along with the housing 42. The connector 36 is positioned such that the outer locking collar 68 may be threadably received on the waste outlet 70 of the RV such that a tight seal is formed between the connector 36 and the outlet 70. In doing so, the flexible coupling 34 may pivot about a horizontal axis and the flexible portion 56 may also be manipulated to achieve this result.

Next, the valve 32 is actuated by turning the lever 62 and thus moving the valve member 60 to provide fluid communication between the waste outlet 70 of the RV and the reservoir 16 through the waste evacuation device 12. Additionally, a valve controlling flow of the waste from the gray and black water tanks of the RV through the outlet 70 may be actuated. The waste flows through the flexible portion 56, the valve 32, through the hose 50 and the flexible coupling 34 past the inlet 18 and into the reservoir 16. When all of the waste from the RV has been dumped, the valve on the RV and the valve 32 on the waste evacuation device 12 are closed. The outer collar 68 is disconnected from the outlet 70 of the RV and the arm 26 is collapsed in telescoping fashion and rotated via movement at the flexible coupling 34 such that the telescoping arm 26 is again supported at the cradle 40 on the base 24.

In this way, the waste generated by use of the conveniences which are ubiquitously found on recreational vehicles today may be quickly, cleanly, and effectively disposed of without the spills and other messes which often occur in the related art. The waste evacuation device 12 of the present invention is not subject to the size limitations which are typically associated with the RV mounted drainage assemblies. Further, the waste evacuation device 12 of the present invention obviates the need for complicated and expensive drainage assemblies which are either permanently mounted to the RV or must be carried thereby as presently used in the related art. The waste evacuation device 12 also is uniquely designed to service a multitude of RVs and other vehicles which generate fluid borne waste.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A holding tank assembly having a waste evacuation device adapted to receive and hold waste originating from a source such as a recreational vehicle, said holding tank assembly comprising:

a reservoir located below ground having at least one inlet for receiving and holding waste originating from a source, and a base disposed above ground and accommodating said inlet;

a telescoping arm having first and second ends; and a flexible coupling mounted to said reservoir and providing fluid communication between said telescoping arm and said at least one inlet to said reservoir, said telescoping arm mounted to said flexible coupling at said first end and being extendable in telescoping fashion from said flexible coupling and including a connector located at said second end for providing selective fluid communication with the source of waste, said flexible coupling including a body having an inlet port in fluid communication with said telescoping arm, a dump port in fluid communication with said reservoir and a central passage extending therebetween, said central passage being pivotal about a horizontal axis and rotatable about a vertical axis to provide relative adjustability for said telescoping arm such that said connector may be positioned to be selectively connected with the source of waste.

2. A holding tank assembly as set forth in claim 1 wherein said flexible coupling is rotatable 360° about a vertical axis.

3. A holding tank assembly as set forth in claim 1 wherein said at least one inlet defines a stepped bore, said central passage including an upper portion, a lower portion, and a hinge pivotable about said horizontal axis operatively interconnecting said upper and lower portions to provide pivotal movement of said flexible coupling about said horizontal axis, said lower portion rotatably received within said stepped bore.

4. A holding tank assembly as set forth in claim 3 wherein said base includes a cover, said lower portion includes an annular flange and a gasket sealingly disposed between said annular flange and said cover.

5. A holding tank assembly as set forth in claim 3 wherein said flexible coupling further includes at least one bearing disposed between said lower portion and said stepped bore for providing smooth rotatable movement of said flexible coupling 360° about a vertical axis.

6. A holding tank assembly as set forth in claim 3 wherein said flexible coupling further includes a flexible sleeve extending between said upper and lower portion surrounding said pivot hinge and an annular collar enclosing said pivot hinge and sleeve between said upper and lower portions.

7. A holding tank assembly as set forth in claim 1 wherein said assembly further includes a valve disposed between said first and second ends of said telescoping arm for providing fluid communication between the source and said reservoir, said valve operable to control the flow of waste through said telescoping arm.

8. A holding tank assembly as set forth in claim 7 wherein said telescoping arm includes a flexible portion extending between said connector and said valve, said valve including a valve body and breakaway coupling interconnecting said flexible portion and said valve body, said breakaway coupling adapted to fail and interrupt fluid communication between said source of said waste and said waste evacuation device.

9. A waste evacuation device as set forth in claim 7 wherein said flexible coupling is rotatable 360° about a vertical axis.

10. A waste evacuation device mountable to a holding tank located below the ground and having at least one inlet, said waste evacuation device comprising:

a base disposed above the ground and accommodating at least one inlet to the holding tank, a telescoping arm having first and second ends and a flexible coupling mounted to said base and providing fluid communication between said telescoping arm and the inlet to the holding tank;

said telescoping arm mounted to said flexible coupling at said first end and being extendable in a telescoping fashion from said flexible coupling and including a connector located at said second end for providing selective fluid communication with a source of waste, said flexible coupling including a body having an inlet port in fluid communication with said telescoping arm, a dump port in fluid communication with said holding tank and a central passage extending therebetween, said central passage being rotatable about a horizontal axis and rotatable about a vertical axis to provide relative adjustability for said telescoping arm such that said connector may be positioned to be selectively connected with a source of waste.

11. A waste evacuation device as set forth in claim 10 wherein said central passage includes an upper portion, a lower portion, and a hinge pivotable about a horizontal axis operatively interconnecting said upper and lower portions to provide pivotable movement of said flexible coupling about said horizontal axis, said lower portion rotatably received within the inlet to the tank.

12. A waste evacuation device as set forth in claim 11 wherein said base includes a cover, said lower portion includes an annular flange and a gasket sealingly disposed between said annular flange and said cover.

13. A waste evacuation device as set forth in claim 11 wherein said flexible coupling further includes at least one bearing disposed between said lower portion and the inlet for providing smooth rotatable movement of said flexible coupling 360° about a vertical axis.

14. A waste evacuation device as set forth in claim 11 wherein said coupling further includes a flexible sleeve extending between said upper and lower portion surrounding said pivot hinge and an annular collar enclosing said pivot hinge and sleeve between said upper and lower portions.

15. A waste evacuation device as set forth in claim 10 wherein said assembly further includes a valve disposed between said first and second ends of said telescoping arm for providing fluid communication between the source and said reservoir and said valve operable to control the flow of waste through said telescoping arm.

16. A waste evacuation device as set forth in claim 15 wherein said telescoping arm includes a flexible portion extending between said connector and said valve, said valve including a valve body and breakaway coupling interconnecting said flexible portion and said valve body, said breakaway coupling adapted to fail and interrupt fluid communication between said source of said waste and said waste evacuation device.

\* \* \* \* \*

UNITED STATES PATENT AND TRADEMARK OFFICE
CERTIFICATE OF CORRECTION

PATENT NO. : 5,947,156
DATED : September 7, 1999
INVENTOR(S) : Frederick A. Tomczyk It is certified that error appears in the above-identified patent and that said Letters Patent is hereby corrected as shown below:

Column 8, line 37, change claim"9." to claim --10. -- and change the dependency "claim 7" to --claim 9--.

Column 8, line 40, change claim "10." to --9.--.

Signed and Sealed this

Twenty-sixth Day of December, 2000

Attest:

Q. TODD DICKINSON

*Attesting Officer*   *Director of Patents and Trademarks*